United States Patent [19]

Anderson et al.

[11] 4,380,953
[45] Apr. 26, 1983

[54] TRANSFER MECHANISM IN A PEACH PITTER

[75] Inventors: David M. Anderson, Lafayette, Calif.; John C. Erb, Carson City, Nev.

[73] Assignee: Filper Corporation, Reno, Nev.

[21] Appl. No.: 230,240

[22] Filed: Feb. 2, 1981

Related U.S. Application Data

[63] Continuation-in-part of Ser. No. 940,917, Sep. 11, 1978, Pat. No. 4,254,701.

[51] Int. Cl.³ .......................... A23N 4/04; A23N 4/22
[52] U.S. Cl. ........................................ 99/549; 99/551; 99/552; 99/554
[58] Field of Search ................. 99/486, 490, 547, 548, 99/549–554; 414/738, 739, 744 A, 753, 225, 226; 198/385, 486, 653, 695, 696; 294/106, 99 R

[56] References Cited

U.S. PATENT DOCUMENTS

| | | | |
|---|---|---|---|
| 528,257 | 10/1894 | Murray | 294/99 R |
| 2,786,562 | 3/1957 | McClelland | 198/385 |
| 3,370,879 | 2/1968 | Green et al. | 294/99 R |
| 4,109,570 | 8/1978 | Silvestrini | 99/551 |
| 4,206,697 | 6/1980 | Meissner | 99/551 X |

*Primary Examiner*—Philip R. Coe
*Assistant Examiner*—Timothy F. Simone

[57] ABSTRACT

In a peach pitter of the type including a pair of blades which both bisect the peach and grip the peach pit, a pair of jaws which twist the peach halves to remove them from the pit, and an aligner which orients the peaches so that their suture planes lie in the plane of the blades, a transfer mechanism is disclosed which accurately feeds individual, oriented peaches from the aligner to the blades in a sequence which minimizes the time required. A pair of claws grasp a peach at a transfer point on the aligner when it is momentarily substantially stationary and immediately carry the peach through an arc toward the blades.

As the peach is impaled on the lower of the pair of blades, the upper blade descends to grip the pit. The claws, which are specially designed to insure that the peach is properly aligned with the pitting axis extending between the blades, are then released from the peach and rapidly returned to the transfer point in spread-apart condition ready to receive the next peach.

A quick-acting four-bar linkage is disclosed which rapidly closes the claws on the peach at the aligner, translates the claws from the aligner to deposit the peach at the pitting station, and releases the claws and retracts them in the brief interval before the pitter jaws grasp and twist the peach halves loose from the held pit. The linkage is also timed with the aligner and pitter functions so as to expedite the overall pitting operation.

8 Claims, 12 Drawing Figures

TRANSFER MECHANISM IN A PEACH PITTER

This application is a continuation-in-part of application Ser. No. 940,917, U.S. Pat. No. 4,254,701 filed Sept. 11, 1978.

SUMMARY OF THE INVENTION

This invention relates to a single, unitary machine composed of an assembly of components for receiving clingstone peaches from a travelling belt and discharging peach halves and pits into a flume or belt below the other end of the machine. The peach pitter of this invention is of the type commonly known as a "torque" pitter in which the peach flesh is bisected by a pair of blades up to the pit, the pit is gripped at its opposite edges and the peach halves are twisted or "torqued" in opposite directions about an axis through the held pit.

In order for a clingstone peach to be properly pitted by the torque method, it is necessary that it be positioned with its suture plane in the plane of the peach bisecting blades. The machine of this invention therefore, includes a peach orienting assembly which accepts peaches one by one and aligns or orients the same with their sutures in a single plane for transfer to the peach bisecting blades. Peaches aree fed one by one to the orienting assembly by a feeder which receives the same from a horizontal travelling belt or "merry-go-round" commonly found in a peach cannery.

In particular, this invention relates to a mechanism for transferring peaches one by one from the orientor or aligner to a pitting station during each cycle of the machine. Because production, i.e., the number of peaches pitted per unit of time, is an important factor, the transfer mechanism of this invention accurately grips opposite sides of a properly oriented peach in the aligner while the same is momentarily substantially at rest at a transfer station and rapidly deposits the same between the peach bisecting blades at a pitting station.

The transfer mechanism includes specially designed peach engaging claws which serve to center the peach between them so that the pit is properly located substantially centrally about the pitting axis extending transversely between the pit-gripping means on the blades. The mechanism translating the claws is so arranged and driven that the claws are yieldably urged together against the peach from the transfer station to the pitting station where the peach is impaled on at least one of the peach bisecting blades. At this point movement of the claws is momentarily arrested, the claws are released from the peach and are thereafter returned to the transfer station in spread-apart condition ready to receive the next successive peach from the aligner.

It is therefore an object of this invention to provide peach transfer mechanism which rapidly and accurately transfers a peach from an aligner to a torque peach pitting station while maintaining proper orientation of the peach.

It is another object of this invention to provide peach transfer mechanism which properly centers a peach with its pit intersecting a peach pitting axis at a pitting station.

Still another object of this invention is the provision of a transfer mechanism which serves to yieldably urge a pair of opposed claws into peach embracing relationship at a transfer station, to translate the held peach to a remote pitting station while maintaining such relationship, and to thereafter release the peach.

Other objects and advantages will become apparent from the following description taken in connection with the accompanying drawings.

DETAILED DESCRIPTION

Figure 1:
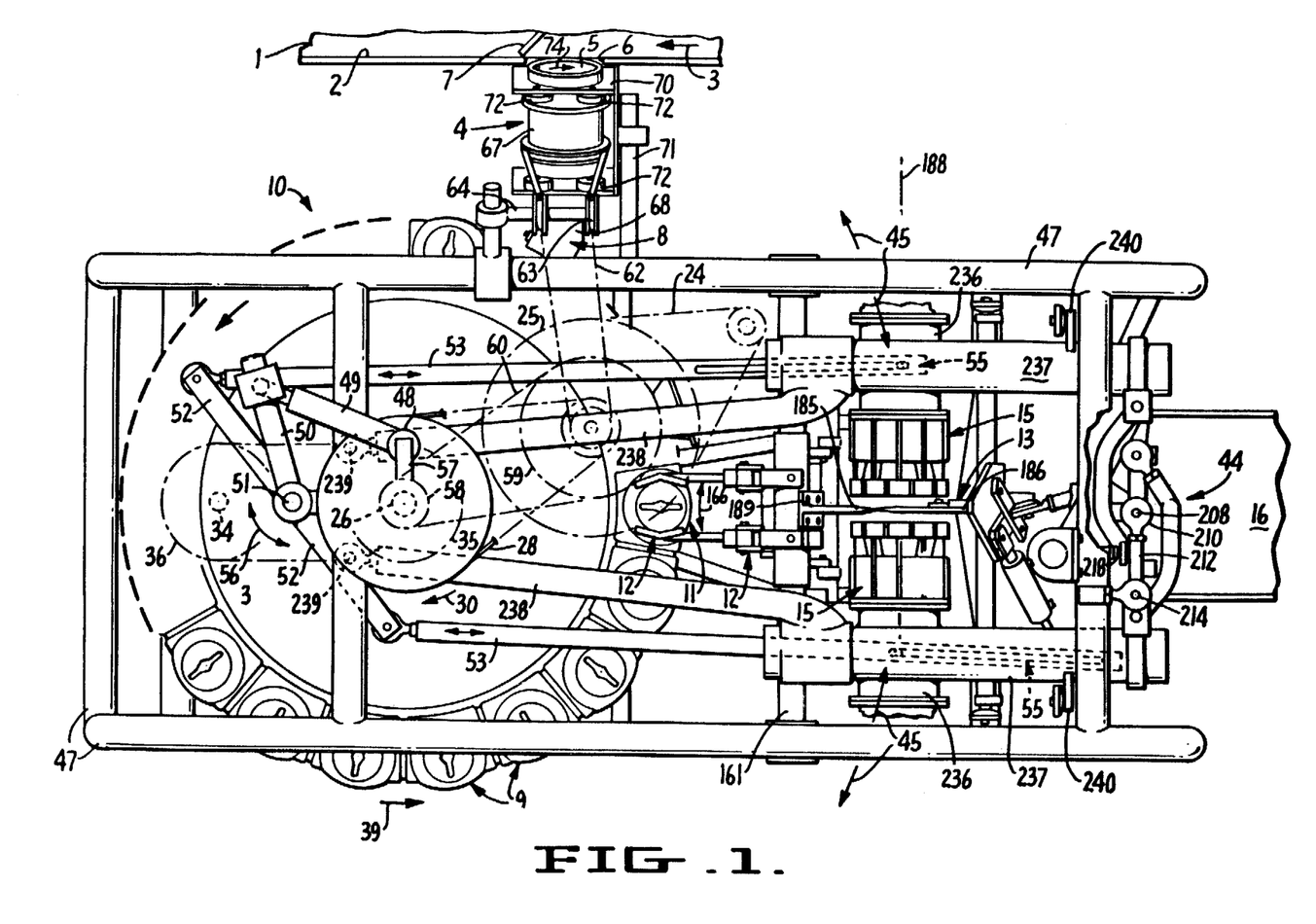
FIG. 1 is a top plan view of the preferred embodiment of the peach pitter of this invention.

Referring to FIG. 1 the travelling belt or merry-go-round 1 has side walls 2 for supporting a single layer of cling peaches travelling in the direction shown by arrow 3.

The downwardly inclined feeder, generally designated 4, of this invention is supported with its upper, elongated inlet end 5 adjacent an opening 6 in side wall 2. A diverter rod 7 lying adjacent the surface of belt 1 serves to urge peaches on the belt toward inlet opening 5.

From the lower discharge end 8 of feeder 4 the peaches are fed one by one into the aligner cups 9 arranged around the circumference of the horizontally disposed, circular aligner 10 as each passes discharge end 8 (also referred to as the "fill" station of aligner 10).

During the process of orienting the peaches, aligner cups 9 travel around the circular path of the circumference of aligner 10 to a transfer station 11, approximately 300 degrees from the discharge end 8 of feeder 4 in the embodiment shown in FIG. 1.

At transfer station 11 each peach in turn, oriented with its suture plane in the vertical central plane of the machine, is transferred by transfer mechanism, generally designated 12, to the peach bisecting blades, generally designated 13, supported in the same plane. These blades have pit gripping teeth 14 (FIG. 2) projecting from their opposed edges which grip the edges of the peach pit as the blades 13 move toward each other and slice through the peach flesh on opposite sides of the pit.

The peach gripping jaws, generally designated 15, are supported on opposite sides of blades 13. Such jaws are spaced from blades 13 as the peaches are transferred thereto and thereafter move toward each other to grip the halves of the peach on opposite sides of blades 13. Jaws 15 (FIG. 1) rotate in opposite directions about an axis extending through the pit which is held by teeth 14 on blades 13 to twist the peach halves loose from the pit.

Thereafter, jaws 15 separate, blades 13 move apart and the peach halves and pit fall by gravity and by the force imparted by the next incoming peach into a belt or flume 16 therebelow.

DRIVE

The entire apparatus is driven by a motor 21 (FIGS. 2, 3) whose shaft pulley 22 continuously drives intermediate shaft 23 through timing belt 24 and pulley 25. Shaft 23 is connected to main shaft 26 for continuously driving the same by pulley 27, timing belt 28, and pulley 29 in the direction of arrow 30 (FIG. 1).

Figure 2:
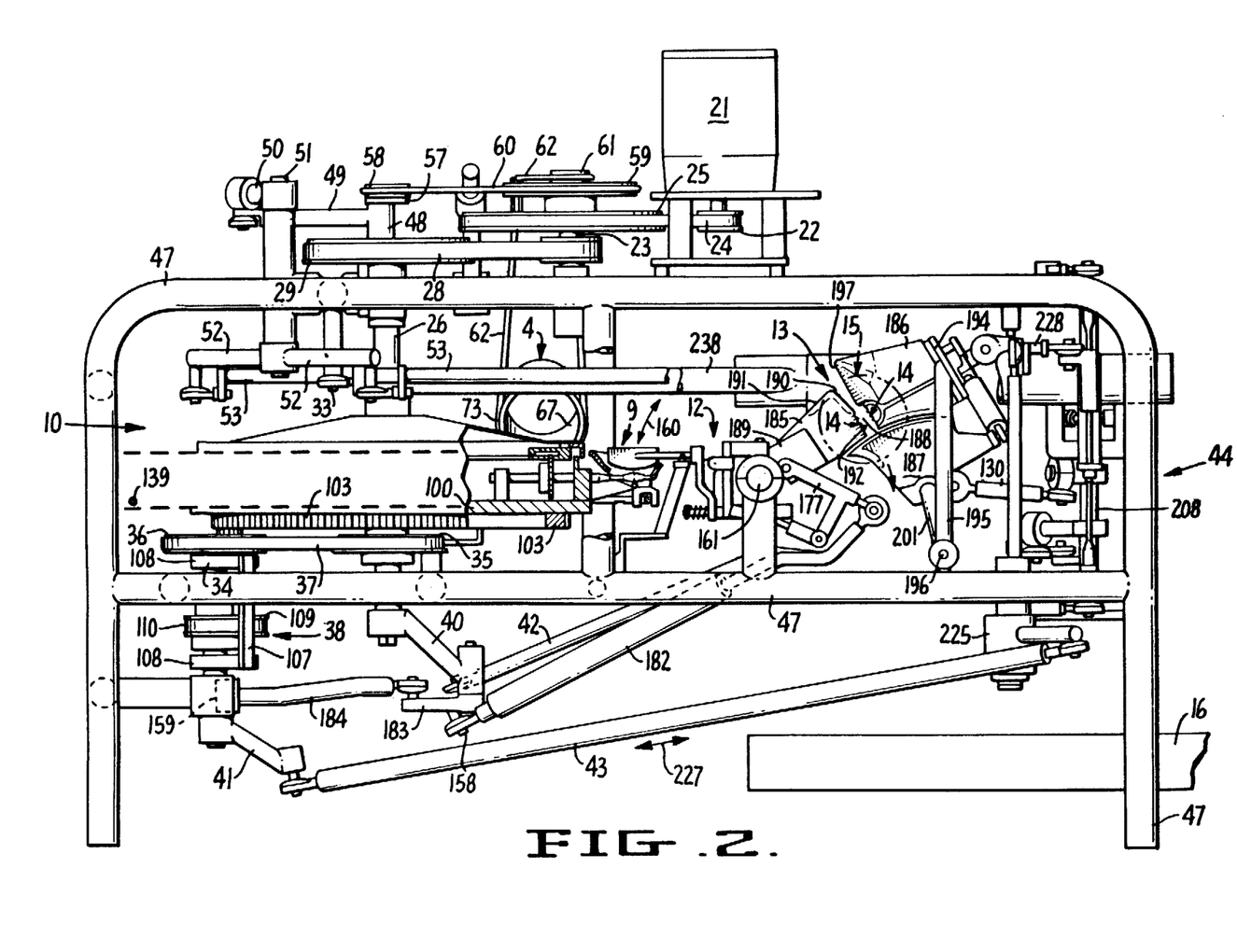
FIG. 2 is a side elevational view of the peach pitter of FIG. 1.
Figure 3:
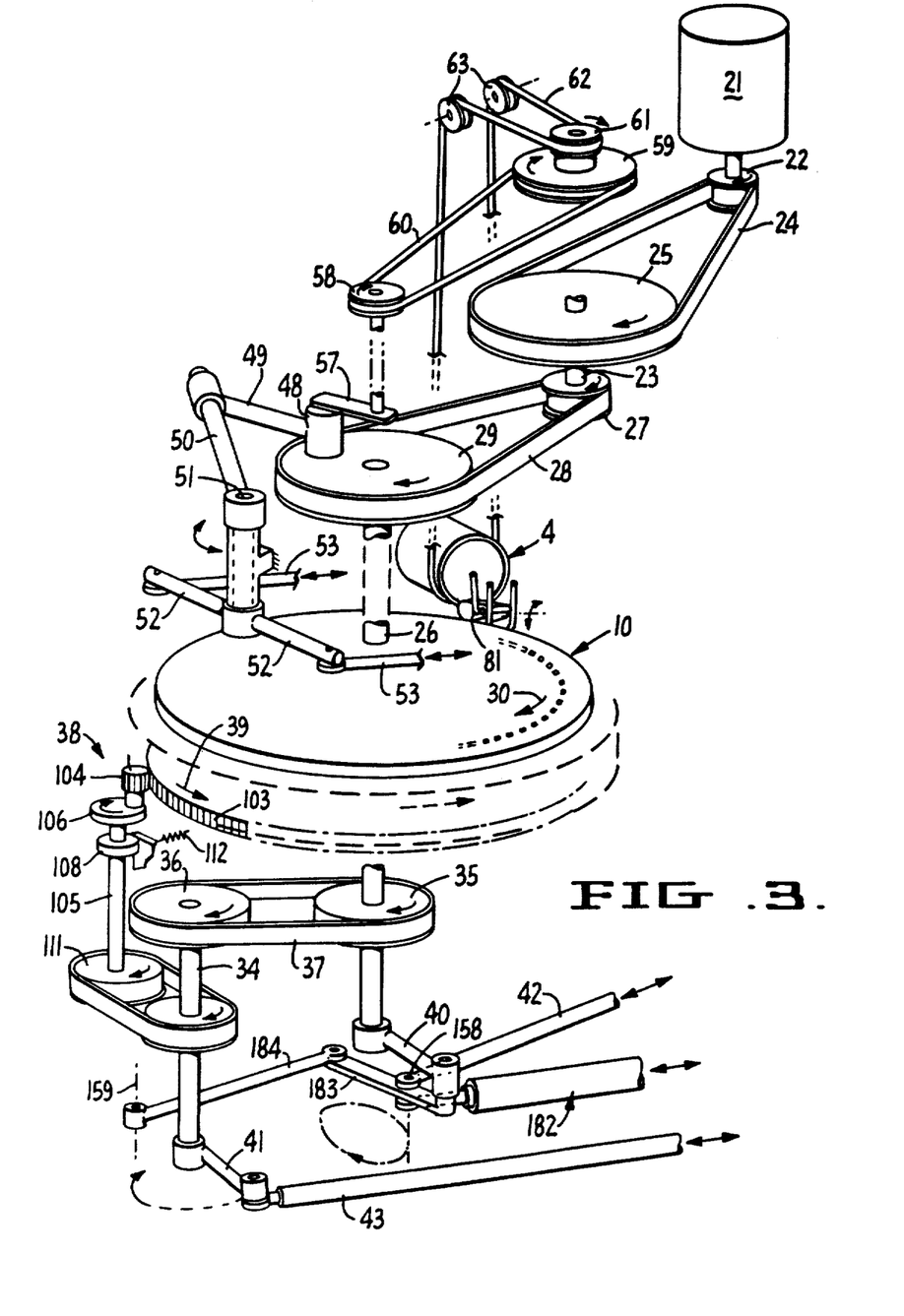
FIG. 3 is an exploded perspective view of the principal drive train of the peach pitter of FIGS. 1, 2.

Near its lower end shaft 26 is connected to auxiliary shaft 34 by pulleys 35, 36 on the respective shafts connected by belt 37 for continuously driving shaft 34 in the same direction and at the same speed as shaft 26.

The cyclic drive assembly 38 (FIGS. 2, 3) is supported on shaft 34 intermediate its ends and functions to drive aligner 10 intermittently in the direction of arrow 39 (FIG. 1). Crank arms 40, 41 (FIG. 2) are respectively secured to the lower ends of shafts 26, 34 for continuous rotation therewith. The other end of crank arm 40 is pivotally connected to one end of a link 42 for actuating transfer mechanism 12.

The other end of crank arm 41 is pivotally connected to one end of a link 43 which drives the linkage assembly 44 at the other end of the pitting machine. Linkage assembly 44 operates the closing of blades 13 through the peach and into gripping relation with the pit, the moving of peach gripping jaws 15 into gripping relation with the exposed opposite halves of the peach, and the retraction thereof in the directions of arrows 45 (FIG. 1).

All shafts are suitably journaled for rotation in bearings supported on a main frame 47.

Extending from a boss 48 mounted on pulley 28 eccentric to shaft 26 is a crank arm 49 which is pivotally connected at its other end to one end of an arm 50 (FIGS. 1-3). The other end of arm 50 is secured to vertical shaft 51, from the other end of which oppositely extend arms 52. The outer ends of arm 52 are pivotally connected to rods 53 which extend toward each of peach gripping jaws 15 and are operatively connected to the means 55 for rotating said jaws.

From this structure it will be noted that as main shaft 26 rotates through 360 degrees, crank 49 and arm 50 drive arms 52 from the position shown in FIG. 1 to a position extending from upper right to lower left and return as indicated by arrow 56. This action results in generally oppositely reciprocating movement of rods 53 thereby rotating peach gripping jaws in opposite directions during approximately a third of a single revolution (to twist the gripped peach halves loose from the held pit) and during the remainder of the revolution to return the open jaws to their initial positions. In the positions shown in FIG. 1 jaws 15 have just been rotated to twist the peach halves and are in a position to be returned to their initial, before-pitting, positions.

Also secured to the upper end of boss 48 is a crank arm 57 (FIGS. 1-3) which projects back toward and supports a pulley 58 over the center of shaft 56. Pulley 58, therefore, rotates about the same center and at the same speed as shaft 26. Pulley 58 drives idler pulley 59, which is rotatively mounted on intermediate shaft 23, by belt 60.

A pulley 61 is rotatively mounted on shaft 23 and is secured to idler pulley 59. A belt 62 trained over pulley 61 and a pair of pulleys 63 mounted on a horizontal stub shaft 64 serves to rotatively drive tubular feeder 4.

In substance by the above (FIGS. 1-3), all the major functional components of the peach pitter, the feeder 4, aligner 10, transfer mechanism 12, peach bisecting blades 13 carrying pit gripping teeth 14, and peach gripping and twisting jaws 15, are connected to and driven from main drive shaft 26, supported in the central plane of the machine and about which aligner 10 is supported for rotation.

TRANSFER

Transfer mechanism 12 (FIGS. 1, 2) is supported for swinging through approximately 150° arc in the direction of arrows 160 from an aligner cup 9 at transfer station 11 to the pitting station at peach bisecting blades 13 about a transverse, fixed shaft 161 (FIGS. 1, 2, 4, 8) supported at its opposite ends on portions of frame 47 at opposite sides of the machine.

Transfer mechanism 12 comprises a pair of similar, opposed, spaced claws 162 (FIGS. 4, 7, 8) projecting outwardly from generally C-shaped brackets 163 which are mounted for pivoting about vertical axes of pivot pins 164 at spaced points on sleeves 165 journaled on shaft 161. In the positions shown in FIGS. 1, 2, and 4, claws 162 project from shaft 161 toward aligner 10 and over a cup 9 at transfer station 11.

Figures 4, 5, 6, 7:
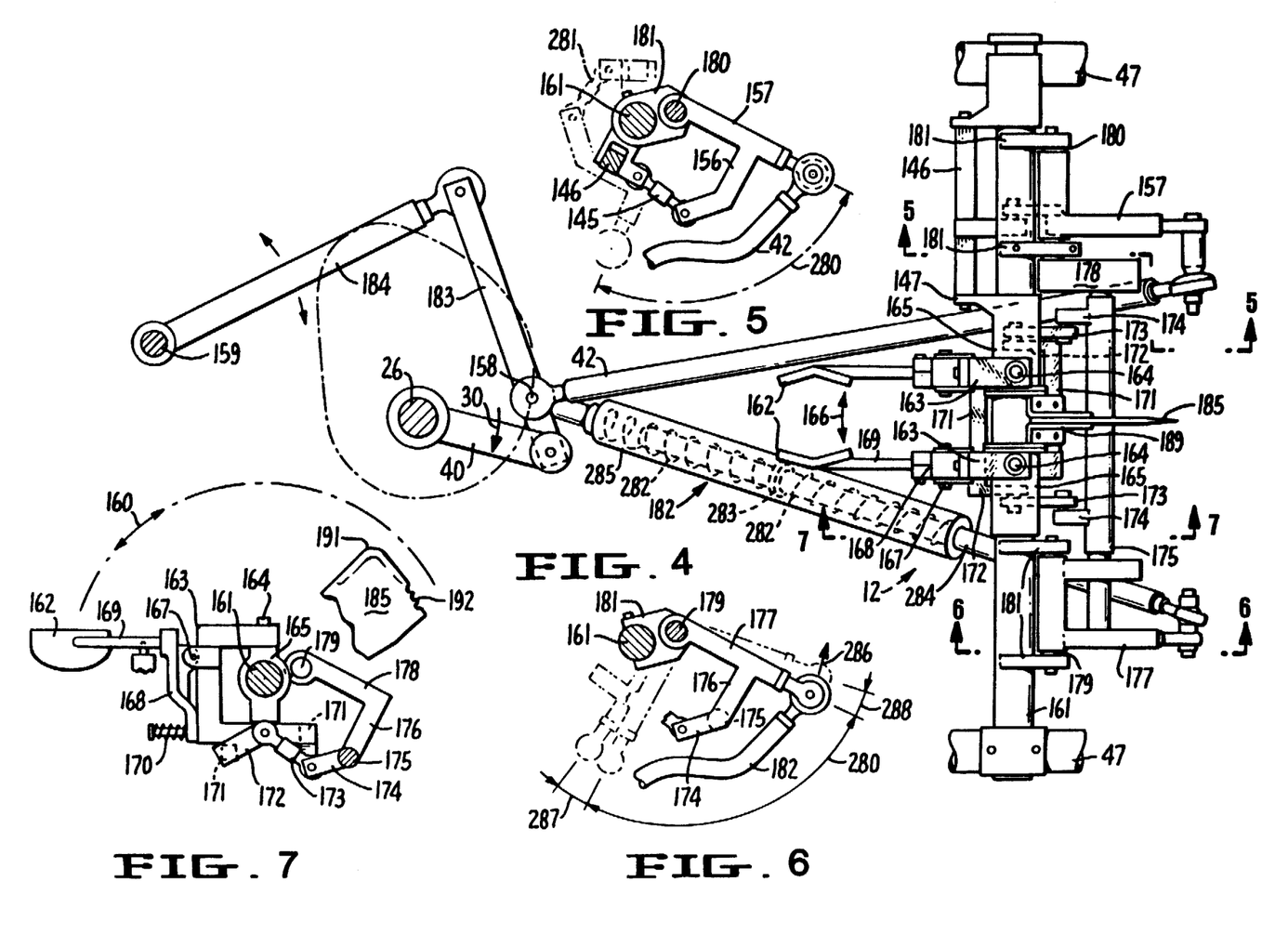
FIG. 4 is a plan view of the transfer mechanism and the drive therefor of the peach pitter of FIGS. 1, 2.
FIG. 5 is a sectional view as seen from line 5—5 of FIG. 4.
FIG. 6 is a sectional view as seen from line 6—6 of FIG. 4.
FIG. 7 is a sectional view as seen from line 7—7 of FIG. 4.
Figure 8:
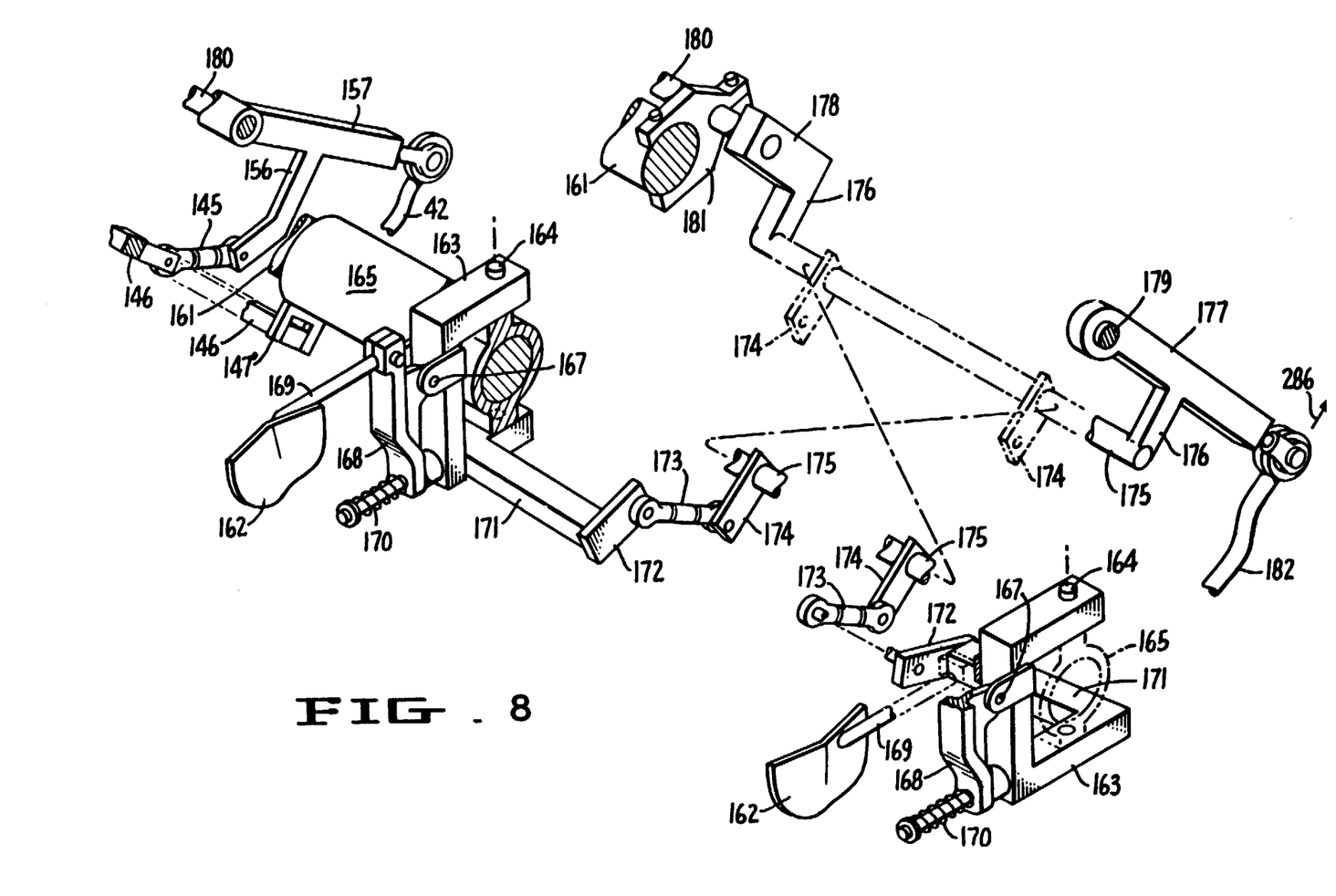
FIG. 8 is an exploded perspective view of the transfer mechanism of FIG. 4.
Figure 9:
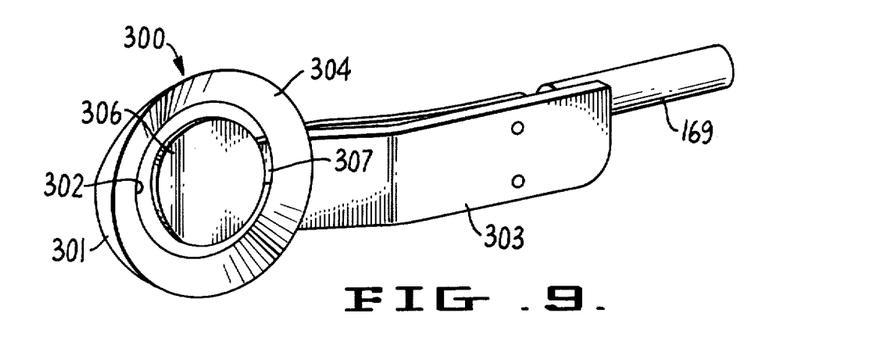
FIG. 9 is a perspective view of a modified form of claw for use with the transfer mechanism of FIGS. 4–8.
Figure 10:
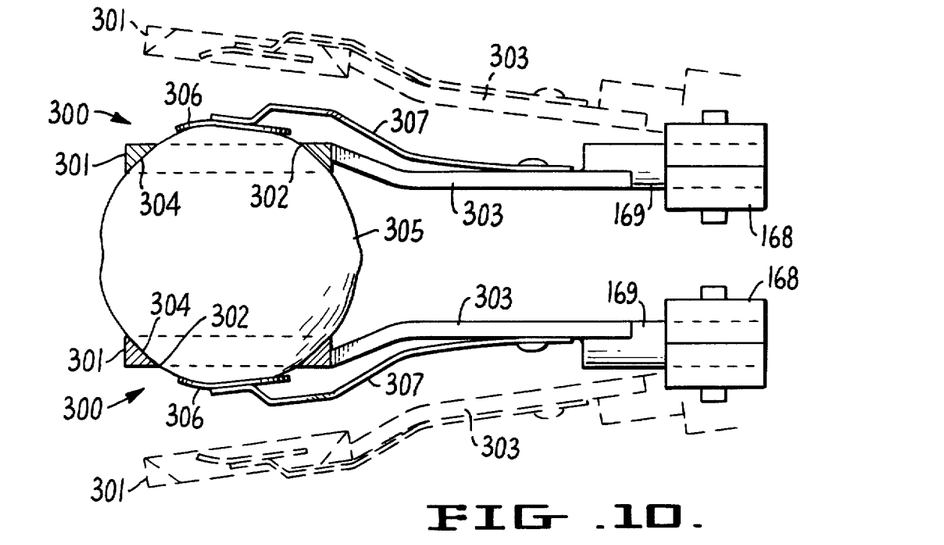
FIG. 10 is a top plan view of a pair of the claws shown in FIG. 9 in engaging relation with a peach, with a disengaged relation shown in dotted lines.
Figures 11, 12:
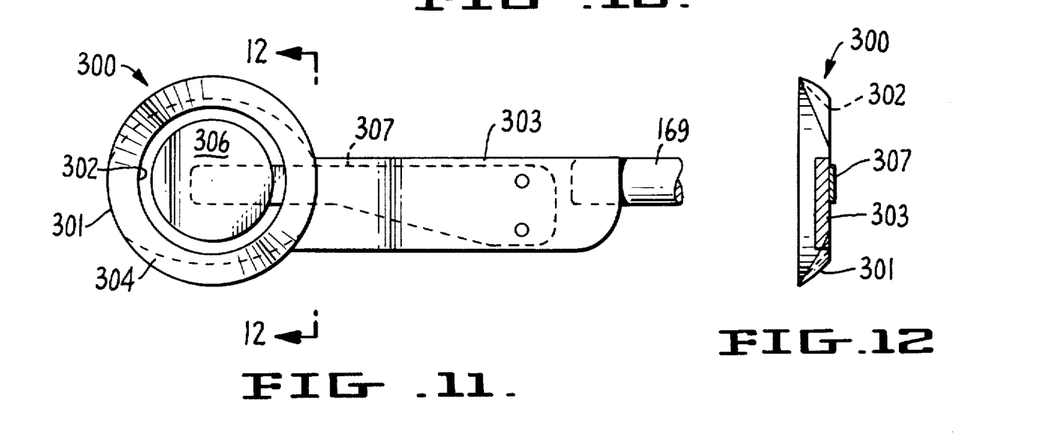
FIG. 11 is a side elevational view of the claw of FIG. 9.
FIG. 12 is a sectional view as seen from line 12—12 of FIG. 11.

In the form shown in FIGS. 4 and 8 the oppositely inwardly facing surfaces of claws 162 are generally concavely formed to a flat V-shape to embrace opposite sides of a peach in an aligner cup 9 at transfer station 11. Should such peach be slightly off center in the cup 9 the V-shaped surfaces of claws of 162 will serve to center the peach at the apex of the V as claws 162 close together on the peach so that when the same is transferred to the pitting station the pit will properly intersect central pitting axis 188 extending transversely of the pitter between pit gripping teeth 14.

The modified form of claw shown in FIGS. 9-12 is generally designated 300 and is in the form of a ring 301 having a central depression or opening 302 and mounted at the end of an elongated bar 303.

Between the outer edges of rings 301 and central depressions 302 rings 300 are formed with oppositely inwardly facing peach engaging surfaces 304 (FIG. 10) which extend divergently oppositely outwardly from each other. In order to properly grip and center a peach 305 surfaces 304 are preferably generally spherical in shape and surround depression or opening 302.

The center of said opening or depression is located similarly to the apex of the V in claw 162 so that it will intersect or lie on pitting axis 188 when said claws have been translated to the pitting station between peach bisecting blades 13 (FIG. 2). In a similar manner, therefore, diverging or sloping peach engaging surfaces 304 serve to center the peach and its pit about pitting axis 188 for proper gripping of said pit by pit-gripping teeth 14.

To assure that the peach 305 is released from claws 300 as the same are spread apart (shown in dotted lines in FIG. 10) at the pitting station, pads 306 may be supported in depressions or openings 302 and yieldably biased, as by leaf spring 307, toward each other. As claws 300 are moved from their spread-apart position shown in dotted line in FIG. 10 to the peach engaging position shown in solid line, yieldable means 306, 307 will be spread apart out of openings 302 by the peach 305. Upon release of the peach at the pitting station pads 306 biased inwardly by springs 307 will return to their normal positions within openings 302 thereby assuring that the peach does not adhere to either claw 300.

In general, the plane of each claw 162,300 and its supporting bracket 163 is vertical, includes pivot axis 164, and is spaced from the central plane of the pitting machine. The mounting so far described permits swinging of claws 162, 300 toward and away from the peach about pivots 164 in the direction of arrow 166 (FIGS. 1, 4) for closing on a peach in an aligner cup 9 and for opening away from the peach after the same has been impaled on the fixed blade 185 or the moving blade 186 of peach bisecting blades 13.

Each claw 162, 300 is also supported for tilting movement in the plane of its bracket 163 by virtue of a pivotal connection 167 (FIGS. 4, 7, 8) supported on said bracket and the vertical leg 168 and horizontally projecting rod 169 on which each claw 162, 300 is supported. Each claw 300 is supported on vertical leg 168 (FIGS. 8, 10) by securement of its corresponding bar 303 to a shortened version of rod 169. A compression spring 170 biases each leg 168 to the generally vertical position and each claw 162, 300 to the horizontal position. Spring 170 allows a slight force to be applied to the peach by claw 162, 300 as soon as claw 162, 300 contacts the peach and also yieldably permits claw 162, 300 to tilt vertically if necessary to avoid forcefully striking a cup 9.

Means for opening and closing claws 162, 300 generally axially of shaft 161 is provided in the form of an elongated bar 171 (FIGS. 4, 7, 8) rigidly secured to each one of the pair of brackets 163 and extending axially past the other bracket of the pair to a transversely extending arm 172. Bars 171 are generally parallel and spaced on opposite sides of pivots 164. Arms 172 are each pivotally connected to a link 173 which in turn is pivoted to a crank arm 174 rigidly secured to a transverse, auxiliary shaft 175 extending parallel to shaft 161.

It will be noted from FIGS. 4, 8 that each arm 174 on one side of the central plane of the machine is connected to the operating bar 171 for the bracket 163 carrying claw 162, 300 on the opposite side of said central plane. As a consequence, relative movement of arms 174 toward claws 162, 300 will cause displacement of the outer ends of operating bars 171 and swinging of claws 162, 300 oppositely away from each other about pivots 164.

Shaft 175 is secured at its opposite ends to lateral extensions 176 (FIGS. 6-8) depending from arms 177, 178 one end of each of which is pivoted on auxiliary shafts 179, 180 (FIGS. 4-8). Shafts 179, 180 are supported for oscillation about their aligned axes parallel to transfer shaft 161 in brackets 181 secured thereto. Shaft 175 carrying arms 174 is therefore supported for translation toward and away from claws 162, 300 in an arc about the common axis of shafts 179, 180.

The end of arm 177 remote from shaft 179 is pivotally connected to the end of a spring link 182 (FIGS. 2, 4, 6, 8) the other end of which is pivotally connected intermediate the ends of an idler link 183. One end of idler link 183 is pivotally connected to the outer end of crank arm 40 and the other end is pivotally connected to one end of an idler arm 184, the other end of which is pivoted to a portion of frame 47 adjacent the lower end of shaft 34, as at 159 (FIGS. 2, 4).

Crank arm 40, idler link 183, idler arm 184 and the intervening frame 47 between pivot 159 and shaft 26 thereby form a four-bar linkage which is configured to reciprocate pivot 158 through a generally egg-shaped pattern (FIGS. 3, 4) as shaft 26 turns through one revolution in the direction of arrow 30 (FIG. 4). Rigid link 42 for driving transfer mechanism 12 through its path of travel from an aligner cup 9 to the pitting position at blades 13 has one of its ends pivotally connected to link 183 at substantially the same point 158 as link 182. The other end of link 42 is pivotally connected to the end of an arm 157 (FIGS. 4, 5, 8), the other end of which is supported for pivoting about shaft 180. Intermediate its ends arm 157 is provided with a depending extension 156 the end of which is pivotally connected by link 145 to a cross bar 146 rigidly connected to an ear 147 projecting radially outwardly from sleeve 165.

Upon rotation of crank 40 through one complete revolution, the reciprocation of link 42 drives arm 157 through an arc 280 (FIG. 5) of approximately 90 degrees about shaft 180 and, because of the linkage connection between arm 157 and ear 147, rotates sleeves 165 carrying claws 162,300 through the approximately 150 degrees arc about the fixed axis of shaft 161 from the position in which claws 162,300 are adjacent an aligner cup 9 (shown in solid line) to the pitting position adjacent blades 13 (shown in dotted line 281) and return. In the position shown in FIGS. 4-8 claws 162,300 have just been closed on a peach in an aligner cup 9 at transfer station 11 and are about to begin their swinging movement about the axis of shaft 161 to impale such peach on lower blade 185 with its pit intersecting axis 188 (FIGS. 2, 7).

From the position shown in FIG. 4 pivot 158 moves along the egg-shaped pattern dictated by the four-bar linkage toward the opposite end of the cycle. At that portion of the pattern, when claws 162,300 are at the pitting station, pivot 158 moves for approximately one-tenth of a cycle along a flattened portion that approximates an arc about the pivotal connection between link 42 and arm 157 as a center. This causes movement of claws 162,300 in the transferring direction to be momentarily arrested at the point where said claws have positioned a peach with its pit intersecting axis 188 and just before said claws are opened to release the peach so the peach will have no inertia to cause it to overtravel the proper pitting position.

The linkage driving claws 162,300 may also be biased in one direction so as to accelerate picking up a peach from an aligner cup 9 which is only momentarily stationary at transfer station 11.

Spring link 182 is extensible and contractable in length by virtue of opposed compression springs 282 (FIG. 4) abutting opposite sides of a central collar 283 secured to the rod portion 284 slidably received in the sleeve portion 285 of link 182. In the condition shown in FIGS. 4-8, and throughout the arc of travel of claws 162,300 to the pitting position, link 42 is leading spring link 182 and the latter is in compression. As a consequence, arm 177, which is constrained to follow in phase with arm 157 through arm 280 (FIG. 6) to the interconnection between sleeves 165 and claw brackets 163, is yieldably urged in the direction of arrow 286 (FIGS. 6, 8) thereby holding claws 162,300 in the closed position gripping a peach by springs 282. In other words, during this portion of the path of travel of transfer mechanism 12 springs 282 of link 182 bias claws 162,300 to the closed position.

Upon pivot point 158 arriving at substantially the midpoint of its cycle of travel when claws 162,300 have transferred a peach to the pitting position, the situation is reversed, link 182 goes through a neutral condition and thereafter leads link 42 through the retracting portion of the cycle. The overtravel, designated 287 (FIG. 6), of link 182 with respect to link 42 at this end of the stroke translates shaft 175 and arms 174 toward claws 162,300 thereby opening claws 162,300 by pivoting brackets 163 about pivots 164 by the linkage previously described. At this point motion of the peach has been arrested by pivot 158 traversing the flattened portion of its egg-shaped pattern of travel.

Thereafter throughout the remainder of the return travel of claws 162,300 to the transfer station adjacent an aligner cup 9, said claws are biased to the open position by link 182 being in tension. Upon the arrival of claws 162,300 at an aligner cup 9 at transfer station 11 link 182 again passes through the neutral condition and overtravels link 42 by the amount designated 288 (FIG. 6) thereby returning claws 162,300 to the closed position for repetition of the cycle. This overtravel 288 of arm 177 serves to translate shaft 175 away from claws 162,300 thereby pivoting the latter toward each other about pivots 164 because of the connection through arms 174, links 173, arms 172 and bars 171 extending transversely from claw brackets 163.

From the above, it will be seen that the pair of opposed claws 162,300 and their supporting brackets 163 are supported for swinging together during a cycle of operation through an arc from an aligner cup 9 to peach bisecting blades 14 and return. Said claws and their corresponding brackets are also separately mounted for swinging about the spaced, parallel axes 164 so that the same may be moved toward each other into gripping relation with a peach in aligner cup 9 at one end of the cycle and away from each other out of such peach gripping relation when the peach has been impaled on blades 13 at the other end of the cycle.

The opposite differential movement between the ends of links 42 and 182 at opposite ends of the cycle, designated 288 and 287, drives crank 177 out of phase with crank 157 thereby causing opposite displacement of auxiliary shaft 175 with respect to the transfer shaft axis 161 and the resulting closing toward each other and opening away from each other of claws 162,300 at the ends of the cycle.

Both the V-shaped claws 162 (FIGS. 6, 8) and the modified form 300 of FIGS. 9–12 serve to center the properly oriented peach so that it is impaled on at least one of blades 13 (FIGS. 1, 2) with its center lying on pitting axis 188. The unique mechanism herein described not only accurately selects each properly-oriented peach from the aligner at exactly the right moment and deposits the same in the appropriate location for pitting, but also performs the transfer and return functions rapidly during the intervals that the successive peaches are being aligned and the preceding peach is being pitted so as to expedite both operations.

It will be noted that by driving all the operative elements from main shaft 26 timing of the various operations of the pitting machine described herein is greatly simplified. During each revolution of shaft 26, for example, an aligner cup 9 is positioned at fill station 8 at the discharge end of feeder 4 for receiving a peach therefrom and another cup 9, having traversed the path of aligner 10 is positioned at transfer station 11. Because of the slower, intermittent travel of aligner cups 9 around the path of aligner 10, ample opportunity is provided for the peaches to be aligned with their suture planes in the central plane of the machine by the time they arrive at transfer station 11.

As aligner cups 9 are being translated to the above noted stations the peach impaled on blades 13 is in the process of being pitted by jaws 15. Upon completion of that pitting cycle jaws 15 and blades 13 open to release the pitted peach halves and pit and transfer mechanism 12 is actuated to transfer a peach from cup 9 at station 11 to the pitting position intersecting axis 188. It is during that operation that jaws 15 are returned to their original positions and the next aligner cup 9 is translated to transfer station 11.

Although one embodiment of the machine has been described herein it should not be taken as restrictive of the invention which may take various modified forms.

What is claimed is:

1. In a transfer mechanism which transfers a peach from an aligner to peach bisecting blades having pit gripping means thereon adjacent to the pitting axis at a pitting station spaced from the aligner while maintaining the suture plane of such peach in the central plane of said blades, the improvement comprising:
   (a) A pair of opposed, spaced claws each supported on one side of said central plane and being formed with oppositely inwardly facing peach-engaging surfaces diverging oppositely outwardly from and surrounding a central depression intersecting said pitting axis when said claws are at said pitting station for centering a peach carried by said claws about said pitting axis;
   (b) Supporting means supporting said claws for movement toward and away from each other;
   (c) Connecting means connecting said claws for movement together from said aligner to said pitting station and for removing said claws toward and away from each other;
   (d) Drive means for moving said claws through a cycle of operation toward and away from said aligner and said pitting station and yieldably urging said connecting means to bias said claws toward each other during movement toward said pitting station for transferring the peach thereto and away from each other during movement toward said aligner for releasing said peach.

2. The transfer mechanism of claim 1, including:
   (e) Yieldable means in said depressions biased toward each other for assuring release of a peach from said claws at said pitting station.

3. The transfer mechanism of claim 1, in which:
   (e) Said drive means includes means for momentarily arresting movement of said claws at said pitting station.

4. The transfer mechanism of claim 1, in which:
   (e) Said drive means includes a pair of diverging links connected at their divergent ends to said connecting means and connected to each other at their convergent ends; and,
   (f) Means reciprocating said links through said cycle of operation and providing opposite differential movement between said divergent ends at opposite ends of said cycle for moving said claws together at the end of said cycle when said claws are adjacent said aligner and apart when said claws are adjacent said pitting station.

5. The transfer mechanism of claim 4, in which:

(g) Said links include biasing means for biasing said links in the directions of said differential movement between opposite ends of said cycle.

6. In a transfer mechanism which transfers a peach through an arc about a horizontal transfer axis from an aligner on one side of said transfer axis to peach bisecting blades having pit gripping means thereon on opposite sides of a pitting axis parallel to said transfer axis at a pitting station on the other side of said transfer axis while maintaining the suture plane of such peach in the central plane of said blades intersecting said axes, the improvement comprising:

(a) A pair of opposed, spaced claws;

(b) A pair of brackets supported for swinging about said transfer axis and supporting said claws projecting therefrom in facing relation on opposite sides of said central plane;

(c) Pivot means supporting each bracket and its corresponding claw for swinging about one pivot axis of a pair of pivot axes extending transversely to said transfer axis and in spaced, parallel relation on opposite sides of said plane;

(d) Connecting means connecting said brackets and their corresponding claws for swinging together through said arc about said transfer axis, including:

(i) an auxiliary shaft extending transversely of said central plane and in parallel relation to said transfer axis, (ii) a pair of parallel bars each connected at one of its ends to one of said brackets at a point offset from its respective pivot axis on the opposite side of said transfer axis from the other of said brackets, and each of said parallel bars projecting to its other end on the side of said central plane opposite its respective bracket;

(iii) linkage means connecting said other ends of said bars to said auxiliary shaft, whereby relative displacement of said auxiliary shaft with respect to said transfer axis causes said brackets and claws to swing about their respective pivot axes toward and away from each other.

7. The transfer mechanism of claim 6, including:

(e) A pair of crank arms supported for swinging about a common axis;

(f) Means connecting one of said crank arms to one of said brackets for swinging said bracket through said arc;

(g) Means connecting the other of said crank arms to said auxiliary shaft;

(h) Driving means for driving said cranks in phase during swinging of said brackets through said arc between said aligner and said pitting station and out of phase for displacing said auxiliary shaft with respect to said transfer axis at opposite ends of said arc.

8. The transfer mechanism of claim 7, in which:

(i) Said driving means includes a pair of diverging links each connected at its divergent end to one of said crank arms and connected to the other at their convergent ends;

(j) Means reciprocating said links through a cycle of operation corresponding to swinging of said brackets and their corresponding claws through said arc and providing opposite differential movement between said divergent ends of said links at the opposite ends of said cycle.

* * * * *